US010613672B2

(12) United States Patent
Imai

(10) Patent No.: US 10,613,672 B2
(45) Date of Patent: Apr. 7, 2020

(54) OPERATION APPARATUS

(71) Applicant: KABUSHIKI KAISHA TOKAI RIKA DENKI SEISAKUSHO, Aichi (JP)

(72) Inventor: Takao Imai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 5 days.

(21) Appl. No.: 15/282,585

(22) Filed: Sep. 30, 2016

(65) Prior Publication Data

US 2017/0108981 A1 Apr. 20, 2017

(30) Foreign Application Priority Data

Oct. 15, 2015 (JP) ................................ 2015-203608

(51) Int. Cl.
*G06F 3/041* (2006.01)
*G06F 3/0488* (2013.01)
(Continued)

(52) U.S. Cl.
CPC ............ *G06F 3/0416* (2013.01); *B60K 35/00* (2013.01); *B60K 37/06* (2013.01); *G06F 3/0488* (2013.01); *B60K 2370/143* (2019.05); *B60K 2370/146* (2019.05); *B60K 2370/1472* (2019.05); *B60K 2370/152* (2019.05); *B60K 2370/199* (2019.05); *B60K 2370/52* (2019.05); *B60K 2370/736* (2019.05); *G06F 2203/04104* (2013.01); *G06F 2203/04808* (2013.01)

(58) Field of Classification Search
None
See application file for complete search history.

(56) References Cited

U.S. PATENT DOCUMENTS

2010/0315372 A1* 12/2010 Ng ........................ G06F 3/0416
345/174
2011/0102339 A1* 5/2011 Lin ....................... G06F 3/0416
345/173
2013/0234960 A1* 9/2013 Yamamoto .......... G06F 3/04883
345/173

FOREIGN PATENT DOCUMENTS

JP 2014-068101 A 4/2014

OTHER PUBLICATIONS

Extended European Search report issued in the corresponding EP application No. 16193539.0 dated Apr. 6, 2017.

* cited by examiner

*Primary Examiner* — Benjamin C Lee
*Assistant Examiner* — Krishna P Neupane
(74) *Attorney, Agent, or Firm* — Roberts Calderon Safran & Cole P.C.

(57) ABSTRACT

An operation apparatus includes a detector that detects contact of a plurality of operating fingers on an operating surface, an area calculator that calculates an area of a detection region in the operating surface where the operating fingers have been detected, and a determiner that, after a state in which two operating fingers are detected has changed to a state in which one operating finger is detected, obtains a sum of areas of two detection regions where the two operating fingers are detected and an area of one detection region where the one operating finger is detected from the surface area calculator, and determines that an operation made by the two operating fingers is continuing when a continuation condition, in which the area of the one detection region is greater than or equal to the sum of the areas of the two detection regions, is established.

10 Claims, 4 Drawing Sheets

(51) Int. Cl.
*B60K 35/00* (2006.01)
*B60K 37/06* (2006.01)

90  203 DETECTION  91
    REGION

OPERATION APPARATUS

The present application is based on Japanese patent application No. 2015-203608 filed on Oct. 15, 2015, the entire contents of which are incorporated herein by reference.

TECHNICAL FIELD

The present invention relates to an operation apparatus.

BACKGROUND ART

An image forming apparatus capable of collective printing, including a display part that displays information, a setter having a function for setting collective printing, and a controller that controls information displayed in the display part on the basis of an item set by the setter, is known as an example of a conventional technique (see Patent Document 1, for example).

The setter of this image forming apparatus has a function for setting an image magnification through a pinch-in operation. The controller has a function for designating a number of images to collect onto a single page in accordance with the image magnification set through the pinch-in operation.

CITATION LIST

Patent Document

Patent Document 1: Japanese Unexamined Patent Application Publication No. 2014-68101A

SUMMARY OF INVENTION

Technical Problem

Devices in which the image magnification of a displayed image is changed through a pinch-in operation, such as the conventional image forming apparatus, have become known in recent years. However, some of such devices, in which when two of an operator's operating fingers make contact with each other or come as close to each other as if being in contact with each other during the pinch-in operation determine that one operating finger has made contact, and fail to function correctly.

Accordingly, an object of the present invention is to provide an operation apparatus capable of improving operability by continuing to determine that two operating fingers are present even in the case where the operating fingers have become so close that the operating fingers are determined to be one operating finger.

Solution to Problem

One aspect of the present invention provides an operation apparatus including: a detector that detects contact of a plurality of operating fingers on an operating surface; an area calculator that calculates an area of a detection region in the operating surface where the operating fingers have been detected; and a determiner that, after a state in which two operating fingers are detected has changed to a state in which one operating finger is detected, obtains a sum of areas of two detection regions where the two operating fingers are detected and an area of one detection region where the one operating finger is detected from the surface area calculator, and determines that an operation made by the two operating fingers is continuing when a continuation condition, in which the area of the one detection region is greater than or equal to the sum of the areas of the two detection regions, is established.

Advantageous Effects of Invention

According to the present invention, operability can be improved by continuing to determine that two operating fingers are present even in the case where the operating fingers have become so close that the operating fingers are determined to be one operating finger.

DESCRIPTION OF EMBODIMENT

Overview of Embodiment

An operation apparatus according to an embodiment is generally constituted of: a detector that detects contact of a plurality of operating fingers with an operating surface; an area calculator that calculates an area of a detection region in the operating surface where an operating finger has been detected; and a determiner that, after a state in which two operating fingers are detected has changed to a state in which one operating finger is detected, obtains a sum of areas of the two detection regions where the two operating fingers are detected and an area of the one detection region where the one operating finger is detected from the surface area calculator, and determines that an operation made by the two operating fingers is continuing when a continuation condition, in which the area of the one detection region is greater than or equal to the sum of the areas of the two detection regions, is established.

Even when the operating fingers become so close to each other that the operating fingers are determined to be one operating finger, the operation apparatus can continue to determine that two operating fingers are present as long as the continuation condition is established, which improves operability compared to a case where this configuration is not provided.

Embodiment

Overview of Operation Apparatus 1

Figure 1A:
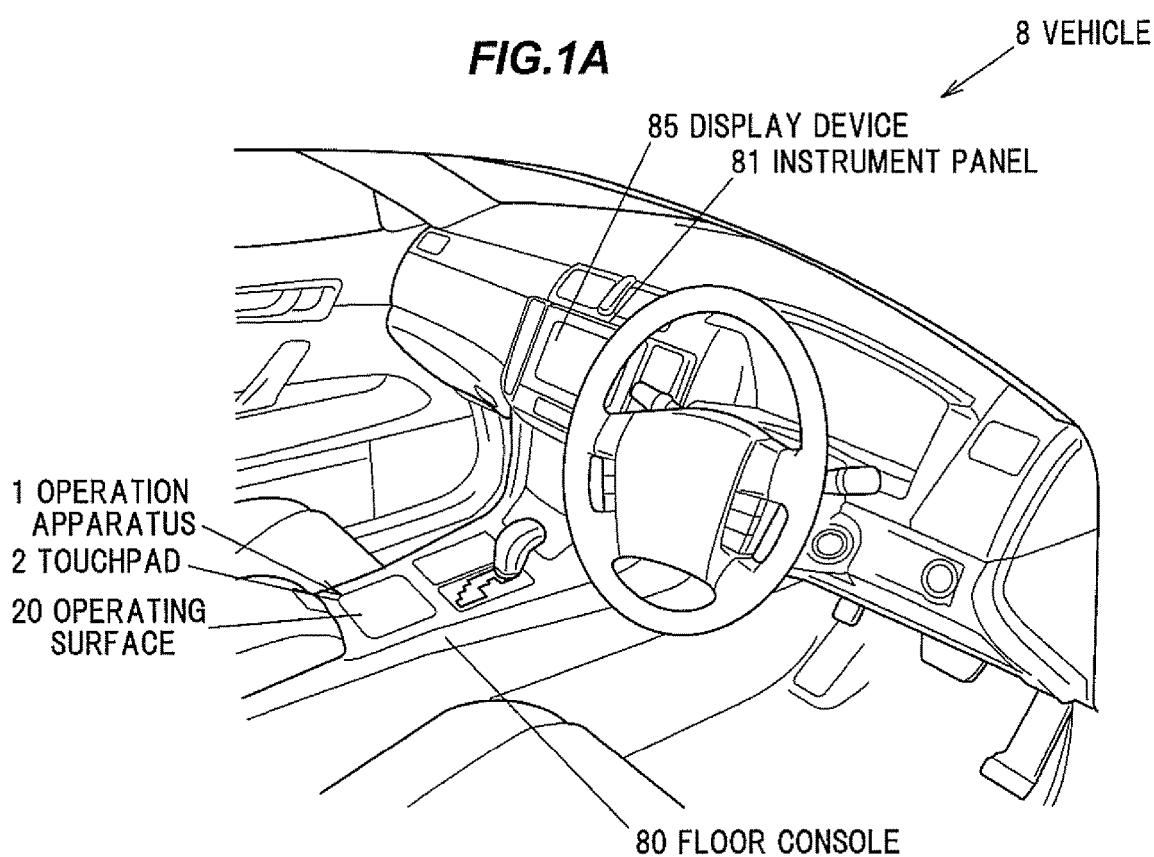
FIG. 1A is a schematic diagram illustrating an example of the interior of a vehicle in which an operation apparatus according to an embodiment is installed.
Figure 1B:
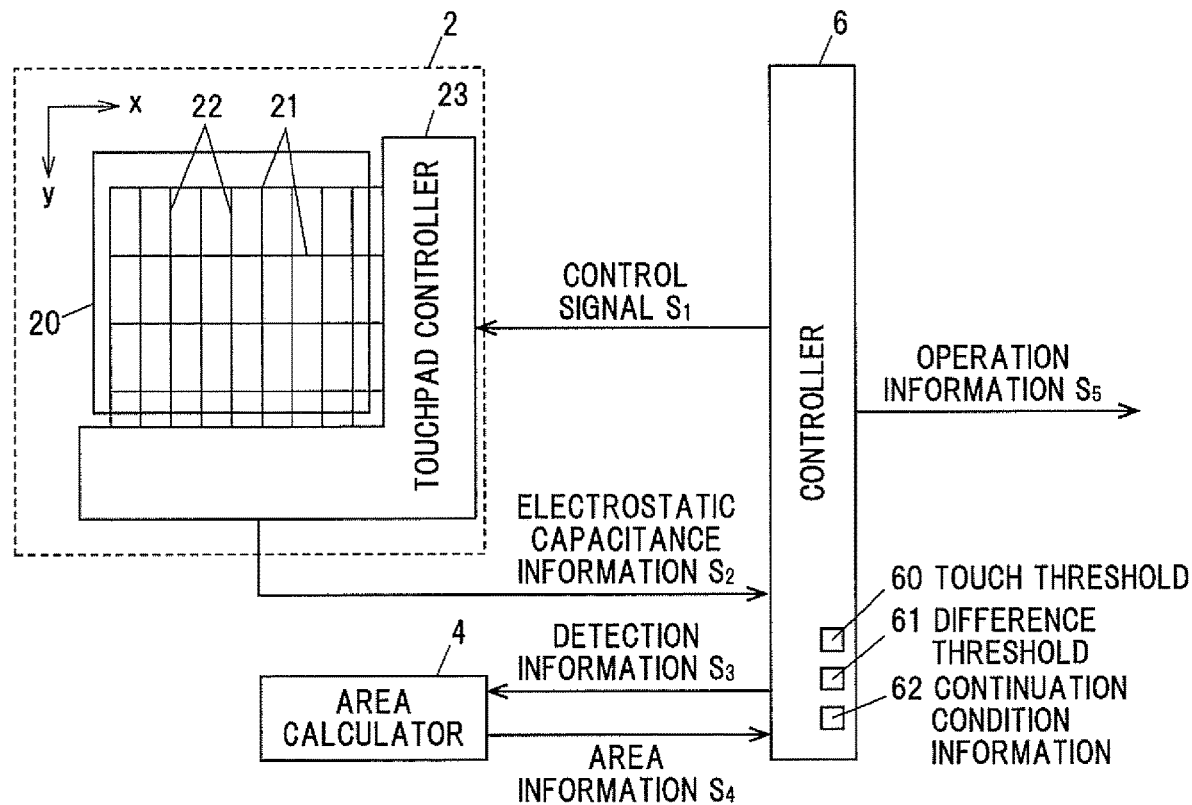
FIG. 1B illustrates an example of a block diagram of the operation apparatus.
Figure 2A:
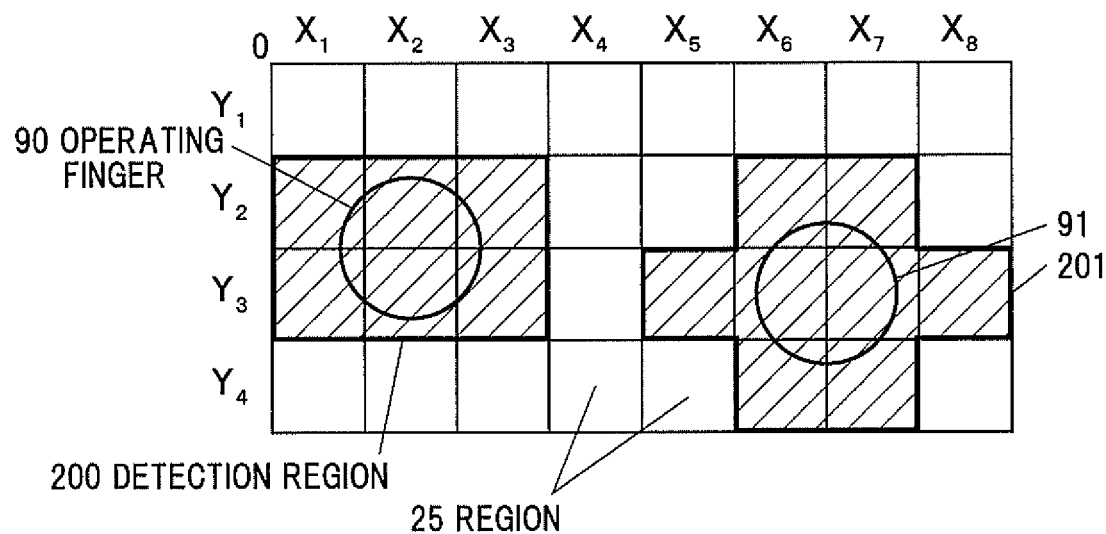
FIG. 2A illustrates an example of an electrostatic capacitance distribution of two separated operating fingers detected by the operation apparatus according to the embodiment.
Figure 2B:
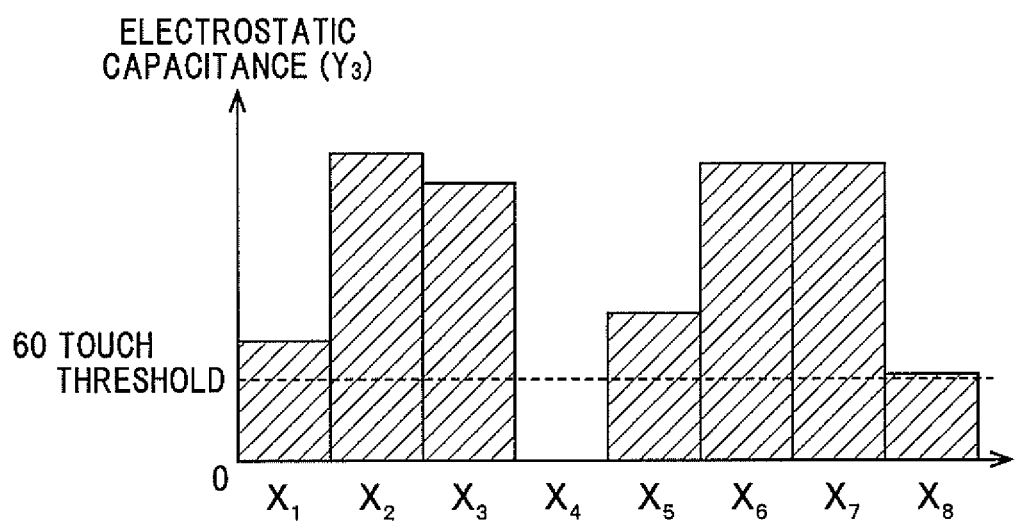
FIG. 2B illustrates an example of electrostatic capacitances at coordinates $(X_1, Y_3)$ to coordinates $(X_8, Y_3)$ illustrated in FIG. 2A.
Figure 3A:
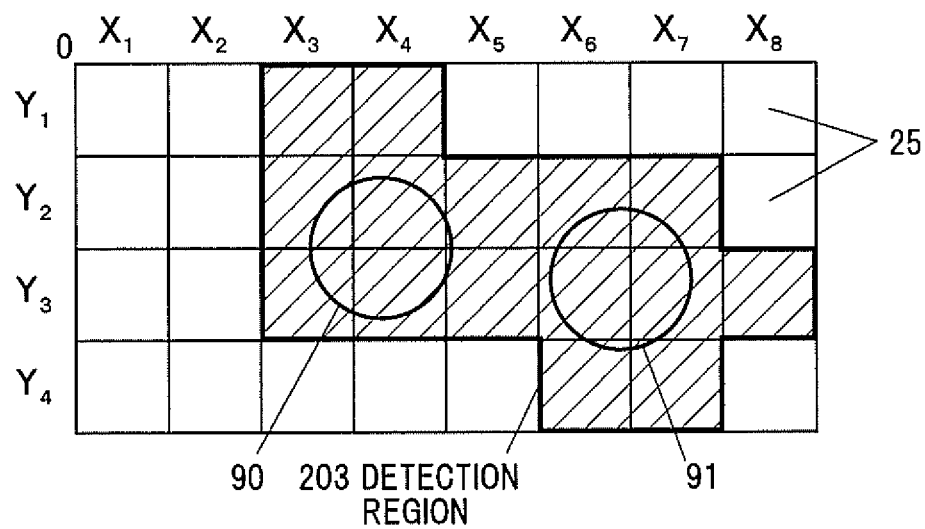
FIG. 3A illustrates an example of an electrostatic capacitance distribution of two adjacent operating fingers detected by the operation apparatus according to the embodiment.
Figure 3B:
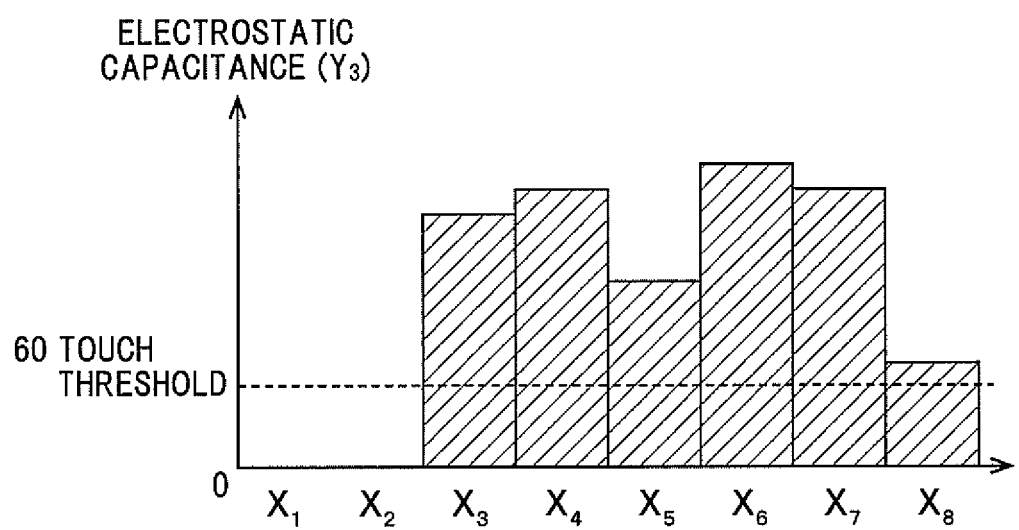
FIG. 3B illustrates an example of electrostatic capacitances at coordinates $(X_1, Y_3)$ to coordinates $(X_8, Y_3)$ illustrated in FIG. 3A.

FIG. 1A is a schematic diagram illustrating an example of the interior of a vehicle in which an operation apparatus according to an embodiment is installed, and FIG. 1B illustrates an example of a block diagram of the operation apparatus. FIG. 2A illustrates an example of an electrostatic capacitance distribution of two separated operating fingers detected by the operation apparatus according to the embodiment, and FIG. 2B illustrates an example of electrostatic capacitances at coordinates $(X_1, Y_3)$ to coordinates $(X_8, Y_3)$ illustrated in FIG. 2A. FIG. 3A illustrates an example of an electrostatic capacitance distribution of two adjacent operating fingers detected by the operation apparatus according to the embodiment, and FIG. 3B illustrates an example of electrostatic capacitances at coordinates $(X_1, Y_3)$ to coordinates $(X_8, Y_3)$ illustrated in FIG. 3A.

FIGS. 2A and 3A illustrate an operating surface 20 as a collection of a plurality of regions 25. Hatched regions 25 indicate regions 25 in which an electrostatic capacitance greater than or equal to a touch threshold 60 (described later) has been detected. The bold solid lines surrounding those regions 25 indicate a detection region in which an operating finger has been detected. Additionally, the general positions of the operating fingers are indicated by solid line circles in FIGS. 2A and 3A. In FIGS. 2B and 3B, the vertical axis represents electrostatic capacitance and the horizontal axis represents an X-axis.

In the drawings associated with the following embodiment, ratios between elements in the drawings may be different from the actual ratios. In addition, in FIG. 1B, arrows indicate the main flows of signals, information, and the like.

An operation apparatus 1 is an apparatus that, for example, can operate an electronic device electromagnetically connected thereto. The operation apparatus 1 is, for example, configured to be capable of detecting an operation in which a detection target such as part of an operator's body (a finger, for example) or a dedicated pen makes contact with the operating surface 20 or comes close enough thereto to be detected, and making instructions such as moving or selecting a cursor displayed in a display part of the electronic device, dragging and dropping displayed icons, and the like in response to the operation. The present embodiment will describe the operation to be made by an operating finger serving as the detection target.

The operation apparatus 1 is, as illustrated in FIG. 1A, installed in a floor console 80 extending between a driver's seat and a passenger's seat of a vehicle 8. A display device 85 that functions as the display part of the electronic device is disposed in an instrument panel 81.

As illustrated in FIGS. 1A and 1B, the operation apparatus 1 is generally constituted of: a touchpad 10 serving as a detector that detects contact of a plurality of operating fingers with the operating surface 20; an area calculator 4 that calculates an area of a detection region in the operating surface 20 where an operating finger has been detected; and a controller 6 serving as a determiner that, after a state in which two operating fingers are detected has changed to a state in which one operating finger is detected, obtains a sum of the areas of the two detection regions where the two operating fingers are detected and the area of the one detection region where the one operating finger is detected from the surface area calculator 4, and determines that an operation made by the two operating fingers is continuing when a continuation condition, in which the area of the one detection region is greater than or equal to the sum of the areas of the two detection regions, is established.

The controller 6 determines the continuation condition using a maximum value of the sum of the areas while the two operating fingers are detected. Further, the controller 6 does not determine the continuation condition when a difference between the areas of the two detection regions of the two operating fingers is greater than or equal to a predetermined difference threshold 61.

Configuration of Touchpad 2

As illustrated in FIG. 1B, the touchpad 2 is generally constituted of a plurality of drive electrodes 21 and detection electrodes 22, and a touchpad controller 23. The drive electrodes 21 and the detection electrodes 22 are disposed below the operating surface 20 that is exposed on the floor console 80.

The drive electrodes 21 and the detection electrodes 22 are formed of a conductive material. Copper, silver, and indium tin oxide (ITO) are examples of such a conductive material. When the touchpad 2 is used to be laid on the display device 85, ITO is used to form transparent electrodes.

As illustrated in FIG. 1B, the drive electrodes 21 and the detection electrodes 22 are arranged in the horizontal direction and the vertical direction in the drawing, with the electrodes insulated from each other. In the present embodiment, the horizontal direction in FIG. 1B corresponds to the X-axis and the vertical direction corresponds to the Y-axis, and the upper-left of the operating surface 20 of the touchpad 2 serves as an origin.

Four drive electrodes 21, for example, are arranged at equal intervals in the X-axis direction. Additionally, eight detection electrodes 22, for example, are arranged at equal intervals in the Y-axis direction.

The touchpad controller 23 is configured, for example, to select a drive electrode 21 to be driven and supply a drive signal thereto in response to a control signal $S_1$ outputted from the controller 6, and to connect the detection electrodes 22 in order and read out an electrostatic capacitance obtained from a combination of the drive electrode 21 and the detection electrode 22.

For example, the touchpad controller 23 furthermore switches the connections to the drive electrodes 21 in order, reads out the electrostatic capacitances for all combinations of the drive electrodes 21 and detection electrodes 22, and outputs electrostatic capacitance information $S_2$ including all the electrostatic capacitances for one period to the controller 6.

Accordingly, electrostatic capacitances are, for example, read out corresponding to coordinates $(X_1, Y_1)$ to coordinates $(X_8, Y_4)$, as illustrated in FIGS. 2A and 2B. In FIGS. 2A and 3A, the operating surface 20 is divided into the plurality of regions 25, which correspond to the coordinates $(X_1, Y_1)$ to the coordinates $(X_8, Y_4)$. The electrostatic capacitance is, for example, a digital value obtained through analog-digital conversion.

Configuration of Area Calculator 4

The area calculator 4 is configured, for example, to calculate the area of a detection region in which an operating finger has been detected on the basis of detection information $S_3$ outputted from the controller 6, and output area information $S_4$.

The detection information $S_3$ is, for example, information generated by the controller 6, as will be described later. The controller 6 compares the electrostatic capacitance in each of the regions 25 with the touch threshold 60, and generates the detection information $S_3$ on the basis of the comparison result in which regions 25 having an electrostatic capacitance greater than or equal to the touch threshold 60 are considered as regions in which an operating finger has been detected.

The area calculator 4 determines the detection regions in which an operating finger has been detected on the basis of this detection information $S_3$. The area calculator 4 takes a collection of four connected regions 25 in which an operating finger has been detected as the detection region, for example. As a modification, the area calculator 4 may determine a collection of eight connected regions as the detection region, and the invention is not limited thereto.

For example, as illustrated in FIG. 2A, when a detection region 200 in which an operating finger 90 is detected includes the regions 25 corresponding to coordinates ($X_1$, $Y_2$) to coordinates ($X_3$, $Y_2$) and coordinates ($X_1$, $Y_3$) to coordinates ($X_3$, $Y_3$), and a detection region 201 in which an operating finger 91 is detected includes coordinates ($X_6$, $Y_2$), coordinates ($X_7$, $Y_2$), coordinates ($X_8$, $Y_3$) to coordinates ($X_8$, $Y_3$), coordinates ($X_6$, $Y_4$), and coordinates ($X_7$, $Y_4$), the area calculator 4 calculates the areas of the detection region 200 and the detection region 201.

The area calculator 4 calculates the area on the basis of the number of the regions 25 contained in the detection region, for example.

Accordingly, the area calculator 4 calculates the area of the detection region 200 for the operating finger 90 as six and the area of the detection region 201 for the operating finger 91 as eight. The area calculator 4 generates the area information $S_4$, which is information on the areas of the detection region 200 and the detection region 201, and outputs the generated area information $S_4$ to the controller 6.

Configuration of Controller 6

The controller 6 is, for example, a microcomputer constituted of a central processing unit (CPU) that carries out computations, processes, and the like on obtained data in accordance with stored programs, a random access memory (RAM) and read-only memory (ROM) that are semiconductor memories, and the like. For example, a program for operations of the controller 6, the touch threshold 60, the difference threshold 61, and continuation condition information 62 are stored in the ROM. The RAM is used as a storage region that temporarily stores computation results, electrostatic capacitances for a plurality of periods, the areas of detection regions in each period, and the like, for example. The controller 6 also includes an internal means for generating a clock signal, and operates on the basis of this clock signal.

The touch threshold 60 is a threshold for determining whether or not an operating finger has been detected.

The controller 6 determines that an operating finger has been detected at coordinates where an electrostatic capacitance greater than or equal to the touch threshold 60 has been detected. Then, on the basis of those coordinates and the electrostatic capacitance at the coordinates, the controller 6 calculates coordinates of a detection point of the detected operating finger using a method such as weighted averaging. The controller 6 outputs information on the calculated coordinates of the detection point, as operation information $S_5$, to the connected electronic device. The electronic device moves a cursor or the like on the basis of the operation information $S_5$, for example.

The difference threshold 61 is a threshold regarding a difference between the areas of two detection regions detected in the same period. The difference threshold 61 is a value that is half the larger of the areas, for example. In other words, the controller 6 does not determine the continuation condition when the difference between the areas of the two detection regions is greater than or equal to half the maximum area of the areas of the two detection regions. The difference threshold 61 is therefore a value that changes depending on the calculated areas.

For example, when the area of the detection region for one operating finger is six and the area of the detection region for the other operating finger is one, the difference therebetween is five and the difference threshold 61 is ½ of six, or three. The difference is greater than the difference threshold 61, and thus the controller 6 does not determine the continuation condition.

The continuation condition information 62 is information regarding the above-described continuation condition. As described above, this continuation condition is a condition in which, after a state in which two operating fingers are detected has changed to a state in which one operating finger is detected, the area of the detection region in which one operating finger has been assumed to be detected is greater than or equal to the sum of the areas of the two detection regions for the two detected operating fingers.

This is because when, for example, two operating fingers are made contact, a gap will always arise between the two operating fingers. As long as this gap is present, the area of the detection region in which the one operating finger has been assumed to be detected will be greater than the sum of the areas of the detection regions for each operating finger.

As illustrated in FIGS. 2A and 2B, the state where two operating fingers are detected corresponds to a state where two detection regions are present. Here, when the continuation condition is confirmed, the controller 6 uses the maximum sum among the sums of areas calculated in each period for the determination of the continuation condition, in order to suppress erroneous determinations caused by an operating finger before the operating finger makes contact with the operating surface 20. As a modification, the controller 6 may determine the continuation condition using an average of the sums of the areas calculated in each period.

A transition from a state in which two operating fingers are detected to a state in which one operating finger is detected refers to a state in which after a period in which two operating fingers are detected, the two detection regions connect in the next period to form one detection region, resulting in one operating finger being detected.

Here, as an example, FIG. 2B indicates the electrostatic capacitances on the X-axis with the Y coordinate fixed to the coordinate $Y_3$, and because a valley of electrostatic capacitances between the detection region 200 and the detection region 201 is formed at the coordinate $X_4$, the detection region 200 and the detection region 201 can be separated on the basis of that valley.

As illustrated in FIG. 3B, when the operating finger 90 and the operating finger 91 have become close enough to almost make contact with each other, the detection region 200 for the operating finger 90 and the detection region for the operating finger 91 overlap. As such, no coordinate having an electrostatic capacitance lower than the touch threshold 60 is present, or in other words, it may be difficult to determine an area corresponding to the above-described valley.

This state will be seen when a pinch-in operation is made on the operating surface 20. This is a state in which after the operator has brought the two operating fingers into contact with the operating surface 20 with the operating fingers separated, the operating fingers make contact with each other in the latter half of an operation that reduces the distance between the operating fingers.

When one operating finger is determined to be present in this operating finger contact in the latter half of the operation, a process for reducing the size of an image displayed in the display device 85 through the pinch-in operation will not continue, which may prevent the reduction rate intended by the operator from being reached.

Likewise, in a pinch-out operation, in the case where the operating fingers are brought into contact with the operating surface 20 with the operating fingers in contact with each other and an operation that separates the operating fingers apart from each other is made, a determination is made to be the detection of one operating finger at first, which may prevent a magnification rate of the image displayed in the display device 85 from reaching the magnification rate intended by the operator.

In either case, the magnification is not the rate intended by the operator, and thus several pinch operations may need to be carried out until the desired image is obtained. This results in poor operability.

However, in the case where the continuation condition is established, the controller 6 determines that an operation made by two operating fingers is continuing in the latter half of the pinch-in operation and determines that an operation is being made by two operating fingers in the former half of the pinch-out operation, and thus the processing can be carried out as intended by the operator.

Figure 4:
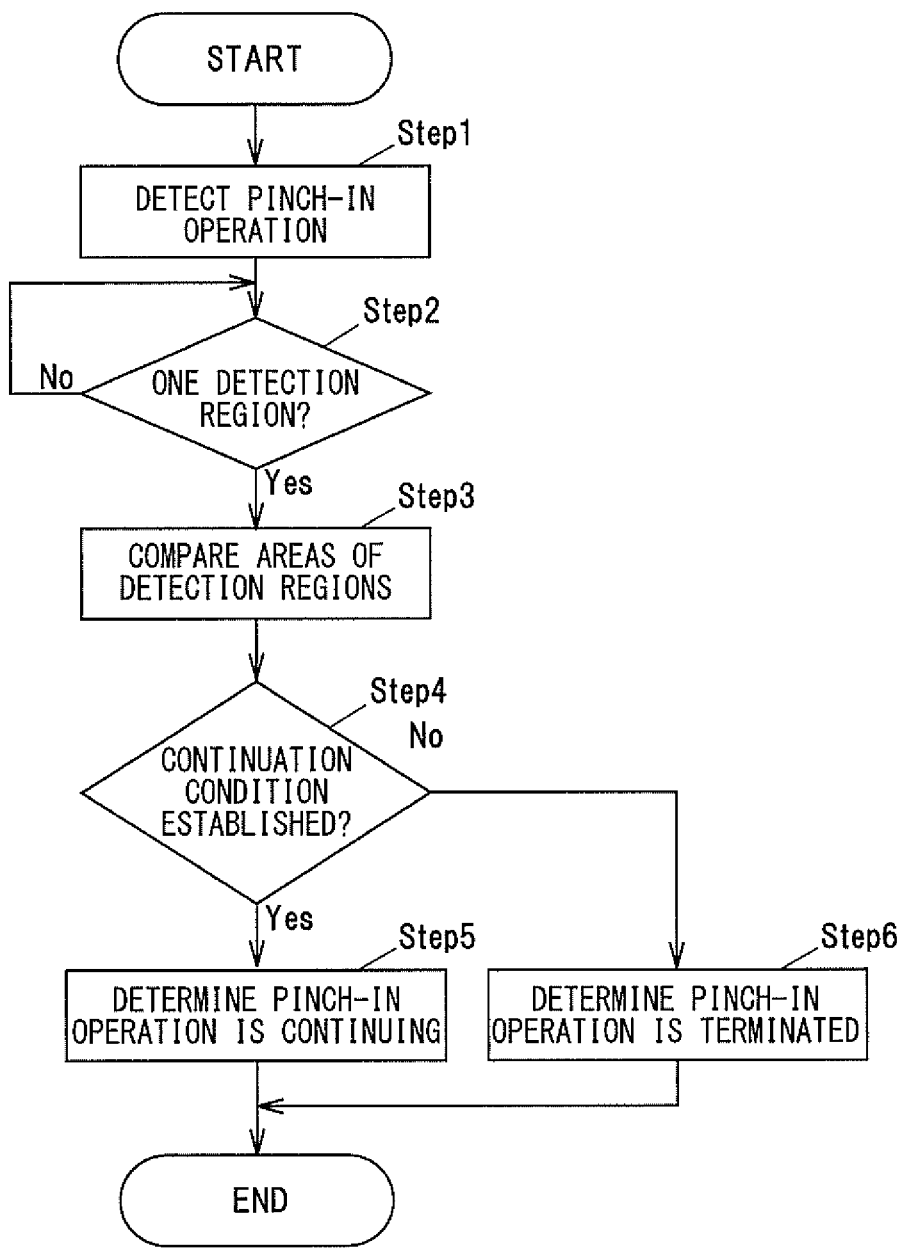
FIG. 4 is a flowchart illustrating an example of processing performed by the operation apparatus according to the embodiment.

An example of operations of the operation apparatus 1 according to the embodiment in the case where the operator makes a pinch-in operation will be described below according to the flowchart illustrated in FIG. 4.

Operation

To reduce the size of an image displayed in the display device 85, the operator brings two separated operating fingers into contact with the operating surface 20 and makes a pinch-in operation that reduces the distance between the operating fingers.

The controller 6 periodically outputs the control signal $S_1$ to obtain the electrostatic capacitance information $S_2$. The controller 6 then determines whether or not the operating fingers have been detected by comparing the electrostatic capacitance based on the obtained electrostatic capacitance information $S_2$ with the touch threshold 60.

When detecting the two operating fingers and determining that a pinch-in operation has been detected on the basis of the electrostatic capacitance information $S_2$ for at least two periods (Step 1), the controller 6 outputs the detection information $S_3$, which is information on electrostatic capacitances greater than or equal to the touch threshold 60, to the area calculator 4. The area calculator 4 outputs, to the controller 6, the area information $S_4$, which is information on the area calculated on the basis of the obtained detection information $S_3$. The controller 6 accumulates the area information $S_4$ in the RAM, for example.

When "Yes" is established in Step 2, or in other words, when determining, on the basis of the area information $S_4$, that the detection regions have become one detection region (Yes in Step 2), the controller 6 extracts the maximum value of the sums of the areas of the two detection regions on the basis of the accumulated area information $S_4$. Then, to determine whether or not the continuation condition based on the continuation condition information 62 is established, the controller 6 compares the area of the detection regions after the detection regions have become one detection region with the maximum value of the sums of the areas of the two detection regions (Step 3).

Note that when determining whether the difference between the areas of the two detection regions where the extracted sum of the areas is highest is greater than or equal to the difference threshold 61, the controller 6 proceeds to the next step upon the difference being lower than the difference threshold 61, and terminates the processing upon the difference being greater than or equal to the difference threshold 61.

When the area of the one detection region is greater than or equal to the sum of the areas of the two detection regions, or in other words, when the continuation condition is established (Yes in Step 4), the controller 6 determines that the pinch-in operation is continuing (Step 5), outputs the operation information $S_5$ indicating that there are two operating fingers, and then terminates the processing. This operation information $S_5$ is generated assuming a distance between the two operating fingers is zero, or as a distance based on the detection regions. The distance based on the detection regions is, for example, a distance between coordinates where the electrostatic capacitance is the maximum value and coordinates where the electrostatic capacitance is the same or the next highest value, a distance between electrostatic capacitance peak values, or the like.

Here, when the continuation condition is not established in Step 4 (No in Step 4), the controller 6 determines that the pinch-in operation is not continuing (Step 6), and outputs the operation information $S_5$ based on a detection point calculated from one detection region.

Effects of Embodiment

The operation apparatus 1 according to the present embodiment can improve operability by continuing to determine that two operating fingers are present even in the case where the operating fingers have become so close that the operating fingers are determined to be one operating finger. Specifically, when two operating fingers are detected as one operating finger during a pinch-in operation, the operation apparatus 1 can determine that the pinch-in operation is continuing by confirming the continuation condition. Additionally, when one operating finger has been detected as two operating fingers during a pinch-out operation, the operation apparatus 1 can determine that the pinch-out operation is starting as a continuation of the initial detection by confirming the continuation condition. Accordingly, the operation apparatus 1 can carry out the processing intended by the operator on the basis of the determination, which improves the operability, as compared to a case where this configuration is not provided.

The operation apparatus 1 can determine the continuation condition using the maximum value of sums of the areas while the two operating fingers are detected, which makes it possible to suppress determinations made using the sum of areas in an unstable state such as when one of the operating fingers is distanced from and not in contact with the operating surface 20. This improves the accuracy of the determination, as compared to a case where this configuration is not used.

The operation apparatus 1 does not determine the continuation condition in the case where the difference between the areas of the two detection regions is greater than or equal to the difference threshold 61, which makes it possible to suppress determinations made using the sum of areas in an unstable state such as when one of the operating fingers is distanced from and not in contact with the operating surface 20. This improves the accuracy of the determination, as compared to a case where this configuration is not used.

The operation apparatus 1 can determine whether one detection region is generated by one operating finger or by two operating fingers during a transition from two detection regions being detected to one detection region being detected and during a transition from one detection region being detected to two detection regions being detected, and it is thus easier for processing in a continuing operation to be the processing intended by the operator. For example, in the case where the operator carries out a pinch-in operation and then slides the two operating fingers that are near each other, the operation apparatus 1 can accurately determine the sliding operation following the pinch-in operation, and cause the electronic device to display processing based on the sliding operation without stopping the processing.

The operation apparatus 1 according to the above-described embodiment and modifications may, depending on the application, be partially realized as a program executed by a computer, an application specific integrated circuit (ASIC), a field programmable gate array, or the like, for example.

Although several embodiments of the present invention and modifications thereof have been described above, these embodiments and modifications are merely examples, and the invention according to claims is not intended to be limited thereto. Such novel embodiments and modifications can be implemented in various other forms, and various omissions, substitutions, changes, and the like can be made without departing from the spirit and scope of the present invention.

In addition, all combinations of the features described in these embodiments and modifications are not necessary to solve the problem. Furthermore, these embodiments and modifications are included within the spirit and scope of the invention and also within the invention described in the claims and the scope of equivalents thereof.

What is claimed is:

1. An operation apparatus, comprising:
   a detector including a touchpad that detects contact of a plurality of operating fingers on an operating surface;
   an area calculator that divides up the operating surface into a plurality of mutually contiguous sub-regions, and calculates an area of a detection region in the operating surface for each operating finger where the operating fingers have been detected by adding up the areas of all of the mutually contiguous sub-regions contacted by each operating finger such that the area of detection region for each operating finger is larger than an area of contact between each operation finger and the operating surface; and
   a determiner including a digital controller that determines whether a two operating fingers state or a one operating finger state is detected, wherein a two operating fingers state is detected when two separate detection regions are initially detected, and a one operating finger state is detected when a single detection region is initially detected,
   wherein the determiner determines that the two operating fingers state is continuing, even though the single detection region is detected after the two detection regions have been detected, when an area of the detected single detection region is equal to or greater than an area of the detected two detection regions irrespective of a distance between two operating fingers of the plurality of operating fingers,
   wherein the determiner determines that the two operating fingers state is not continuing when an area of the detected single detection region is less than an area of the detected two detection regions, irrespective of a distance between two operating fingers of the plurality of operating fingers, and
   wherein the touchpad treats the determined two operating fingers state is continuing versus the determined two operating fingers state is not continuing differently in touchpad operation.

2. The apparatus according to claim 1, wherein the determiner determines a continuation condition using a maximum value of sums of the areas while the two operating fingers are being detected.

3. The apparatus according to claim 1, wherein the determiner does not determine the continuation condition when a difference between the areas of the two detection regions is greater than or equal to a predetermined difference threshold.

4. The apparatus according to claim 3, wherein the predetermined difference threshold is half the larger of the areas of the two detection regions.

5. The apparatus according to claim 1, wherein the determiner determines the continuation condition using an average of the sums of the areas while the two operating fingers are being detected.

6. The apparatus according to claim 1, wherein the determiner determines the continuation condition after a pinch-in operation has been detected.

7. The apparatus according to claim 1, wherein the determiner also determines that the two operating fingers state is continuing in a case when a single detection region indicative of a one operating finger state is initially detected, and when subsequently two separate, non-contacting detection regions are detected indicative of a two operating finger state.

8. The apparatus according to claim 7, wherein the determiner determines that the two operating fingers state is continuing in a case when an area of the detected single detection region is greater than an area of the detected two detection regions.

9. An operation apparatus, comprising:
   a detector including a touchpad that detects contact of a plurality of operating fingers on an operating surface;
   an area calculator that divides up the operating surface into a plurality of mutually contiguous sub-regions, and calculates an area of a detection region in the operating surface for each operating finger where the operating fingers have been detected by adding up the areas of all of the mutually contiguous sub-regions contacted by each operating finger such that the area of detection region for each operating finger is larger than an area of contact between each operation finger and the operating surface; and
   a determiner including a digital controller that determines whether a two operating fingers state or a one operating finger state is detected, wherein a two operating fingers state is detected when two separate detection regions are initially detected, and a one operating finger state is detected when a single detection region is initially detected,
   wherein the determiner determines that the two operating fingers state is continuing in a case when a single detection region indicative of a one operating finger state is initially detected, and when subsequently two separate, non-contacting detection regions are detected indicative of a two operating fingers state,
   wherein the determiner determines that the two operating fingers state is continuing, even though the single detection region is detected after the two detection regions have been detected, when an area of the detected single detection region is equal to or greater than an area of the detected two detection regions, irrespective of a distance between two operating fingers of the plurality of operating fingers, wherein the determiner determines that the two operating fingers state is not continuing when an area of the detected single detection region is less than an area of the detected two detection regions, irrespective of a distance between two operating fingers of the plurality of operating fingers, and wherein the touchpad treats the determined two operating fingers state is continuing versus the determined two operating fingers state is not continuing differently in touchpad operation.

10. The apparatus according to claim 9, wherein the determiner determines that the two operating fingers state is continuing in a case when an area of the detected single detection region is greater than an area of the detected two detection regions.

* * * * *